United States Patent
Naito et al.

(10) Patent No.: US 6,521,013 B1
(45) Date of Patent: Feb. 18, 2003

(54) NIOBIUM SINTERED BODY FOR CAPACITOR AND REPLACE WITH PROCESS FOR PRODUCING SAME

(75) Inventors: Kazumi Naito, Chiba (JP); Atsushi Shimojima, Tokyo (JP)

(73) Assignee: Showa Denko Kabushiki Kaisha, Toyko (JP)

( * ) Notice: Subject to any disclaimer, the term of this patent is extended or adjusted under 35 U.S.C. 154(b) by 0 days.

(21) Appl. No.: 09/762,245

(22) PCT Filed: Aug. 5, 1999

(86) PCT No.: PCT/JP99/04230

§ 371 (c)(1), (2), (4) Date: Feb. 5, 2001

(87) PCT Pub. No.: WO00/08662

PCT Pub. Date: Feb. 17, 2000

Related U.S. Application Data

(60) Provisional application No. 60/108,986, filed on Nov. 18, 1998.

(30) Foreign Application Priority Data

Aug. 5, 1998 (JP) .......................................... 10-221695
Aug. 6, 1998 (JP) .......................................... 10-223280

(51) Int. Cl.⁷ ............................................. C22C 27/02
(52) U.S. Cl. ............................ 75/239; 75/245; 419/12; 419/13; 419/14; 419/23; 361/303; 361/305
(58) Field of Search ..................... 75/245, 244, 239; 361/303, 305; 419/12, 13, 14, 23

(56) References Cited

U.S. PATENT DOCUMENTS

| 4,084,965 A | 4/1978 | Fry | 75/230 |
| 4,954,169 A | 9/1990 | Behrens | 75/228 |
| 5,448,447 A | 9/1995 | Chang | 361/529 |
| 6,051,044 A | 4/2000 | Fife | 75/229 |
| 6,347,032 B2 * | 2/2002 | Naito | 361/303 |

FOREIGN PATENT DOCUMENTS

| GB | 1219748 | 1/1971 | ........... C22B/51/00 |
| JP | 60-152016 | 8/1985 | |
| WO | WO 98/19811 | 5/1998 | ............. B22F/1/00 |

OTHER PUBLICATIONS

Abstract of JP 60–121207.
"Reactions During Sintering of Niobium Powder from Aluminothermic Reduction Product" Gomes et al.; R&HM; Dec. 1985, pp. 189–194.
"The Influence of Gas Atmospheres on the First-Stage Sintering of High-Purity Niobium Powders", Krehl et al., Metallurgical Transactions A, vol. 15A, Jun. 1984; pp. 1111–1116.

* cited by examiner

Primary Examiner—Ngoclan Mai
(74) Attorney, Agent, or Firm—Sughrue Mion, PLLC

(57) ABSTRACT

A niobium sintered body for a capacitor, which exhibits an LC value of not larger than 300 $\mu$A/g as measured after an electrolytic oxide film is formed thereon. The sintered body preferably exhibits a product (CV) [i.e., a product of capacity (C) with electrolysis voltage (V)] of at least 40,000 $\mu$F·V/g. The sintered body is produced by sintering a niobium powder containing at least one niobium compound selected from niobium nitride, niobium carbide and niobium boride. A capacitor manufactured from the sintered body has a large capacity per unit weight and good leak current characteristics. Especially, a sintered body made of a niobium powder having a large average degree of roundness has a relatively large porosity and a good packed density, and a capacitor manufactured from this sintered body has a large capacity and good withstand voltage characteristics.

17 Claims, No Drawings

NIOBIUM SINTERED BODY FOR CAPACITOR AND REPLACE WITH PROCESS FOR PRODUCING SAME

This application claims benefit of No. 60/108986 filed Nov. 18, 1998.

TECHNICAL FIELD

This invention relates to a niobium sintered body for capacitor, which is capable of giving a capacitor having an enhanced capacity per unit weight and exhibiting good leak current (hereinafter abbreviated to "LC") characteristics. Further, it relates to the capacitor, and a process for producing the capacitor.

BACKGROUND ART

Capacitors used for electronic equipment such as portable telephones and personal computers are desired to be of a small volume. Tantalum electrolytic capacitors are popularly used because they have a large capacity relative to their size and good characteristics. As an anode of the tantalum electrolytic capacitors, a sintered body of a tantalum powder is generally used. To further enhance the capacity of the tantalum electrolytic capacitor, it is necessary to increase the weight of sintered body, or to prepare a sintered body from an ultrafine tantalum powder having an enhanced specific surface area.

The increase of the weight of sintered body inevitably leads to an increase of size of capacitor, and thus a capacitor having a desirably small volume cannot be obtained. When a sintered body is prepared from an ultrafine tantalum powder having an enhanced specific surface area, the tantalum sintered body has pores which have a reduced diameter and part of which are clogged upon sintering, and therefore, the sintered body is difficult to impregnate with a cathode material at an after-treating step. To solve these problems, a proposal has been made wherein a sintered body is made of a powdery material having a dielectric constant larger than that of tantalum, such as niobium or titanium.

However, a conventional capacitor using an electrode made of a sintered body of a powdery material having a large dielectric constant has another problem such that the LC characteristics are not satisfactory and the capacitor is of poor practical use. More specifically, in the case where a sintered body is made from a high-capacity tantalum powder exhibiting a product (CV), i.e., a product of capacity× electrolysis voltage, of 40,000 $\mu$F·V/g, the LC value as measured on a sintered body, which has been subjected to electrolytic oxidation, at a voltage of 70% of the electrolysis voltage when three minutes elapsed from the electrolytic oxidation, is usually approximately 30 $\mu$A/g. In contrast, a sintered body made of a conventional niobium powder in a similar manner has an LC value more than 100 times larger than that of the tantalum powder. Thus, a capacitor manufactured from a niobium sintered body is not satisfactory in LC characteristics and leads to enhancement in electric power consumption of an electrical equipment, and the capacitor has poor reliability.

DISCLOSURE OF THE INVENTION

In view of the foregoing prior art, a primary object of the present invention is to provide a capacitor exhibiting good LC characteristics and having an enhanced capacity per unit weight.

As results of an extensive research, the present inventors succeeded in development of a niobium sintered body giving a capacitor having a reduced LC value, and have completed this invention.

In a first aspect of the invention, there is provided a niobium sintered body for a capacitor, which is made of a niobium powder, and characterized by exhibiting an LC value of not larger than 300 $\mu$A/g as measured after an electrolytic oxide film is formed thereon.

The niobium sintered body for a capacitor preferably exhibits a product (CV) [i.e., a product of capacity (C) with electrolysis voltage (V)] of at least 40,000 $\mu$F·V/g, and further preferably contains at least one kind of niobium compound selected from niobium nitride, niobium carbide and niobium boride.

In a second aspect of the invention, there is provided a process for producing a niobium sintered body for a capacitor characterized by sintering a niobium powder containing at least one kind of niobium compound selected from niobium nitride,. niobium carbide and niobium boride.

In a third aspect of the invention, there is provided a capacitor comprising an electrode composed of the above-mentioned niobium sintered body of the invention, a dielectric formed on a surface of the niobium sintered body, and a counter electrode.

BEST MODE FOR CARRYING OUT THE INVENTION

A niobium sintered body of the invention exhibiting a reduced LC value as measured after an electrolytic oxide film is formed thereon is obtained by sintering a niobium powder wherein at least one element selected from nitrogen, carbon and boron is bound to a part of the niobium. The amount of the bound nitrogen, carbon and/or boron, namely, the content of bound nitrogen, bound carbon and/or bound boron in the niobium powder varies depending upon the particular shape of finely divided niobium particles, but, in the case when the niobium powder has a particle diameter of approximately 10 $\mu$m to 30 $\mu$m, the content of each element is usually in the range of 50 to 200,000 ppm by weight. In view of a reduced LC value, said content is preferably in the range of several hundreds to several ten-thousands ppm by weight, and more preferably 500 to 20,000 ppm by weight. In the case when the niobium powder has a particle diameter of at least approximately 3 $\mu$m, but smaller than approximately 10 $\mu$m, said content is usually in the range of 50 to 50,000 ppm by weight. In view of a reduced LC value, said content is preferably in the range of several hundreds to 20,000 ppm by weight, and more preferably 500 to 20,000 ppm by weight. The niobium powder may contain either alone or at least two of the bound nitrogen, bound carbon and bound boron, i.e., niobium nitride, niobium carbide and niobium boride.

The method of nitriding a niobium powder for forming niobium nitride may be any of the conventional methods which include, for example, liquid nitriding, ion nitriding and gas nitriding. However, a gas nitriding carried out in a nitrogen atmosphere is preferable because it is simple and easy. The gas nitriding in a nitrogen atmosphere is effected by allowing a nibium powder to stand in a nitrogen atmosphere. A niobium powder having the objective bound nitrogen content is obtained by carrying out the nitriding at a temperature of not higher than 2,000° C. within tens of hours. In general, the higher the nitriding temperature, the shorter the nitriding time for obtaining the desired bound nitrogen content. Even at room temperature, when a niobium powder is allowed to stand in a nitrogen atmosphere for tens of hours, a niobium powder having a bound nitrogen content of approximately several tens of ppm can be obtained.

The method of carbonizing a niobium powder for forming niobium carbide may also be any of the conventional methods which include, for example, gas carbonization, solid carbonization and liquid carbonization. For example, the carbonization can be effected by allowing a niobium powder to stand together with a carbon source, for example, a carbon material or a carbon-containing organic material such as methane at a temperature of not higher than 2,000° C. under a reduced pressure for from several minutes to tens of hours.

The method of boronizing a niobium powder for forming niobium boride may also be any of the conventional methods which include, for example, gas boronization and solid boronization. For example, niobium boride can be formed by allowing a niobium powder to stand together with a boron source, for example, a boron pellet or a boron halide such as trifluoroboron at a temperature of not higher than 2,000° C. under a reduced pressure for several minutes to tens of hours.

The niobium powder containing at least one of niobium nitride, niobium carbide and niobium boride preferably has an average degree of roundness of at least 0.80. When the niobium powder having an average degree of roundness of at least 0.80 is used, a compact having an appropriate porosity but a high packed density is obtained, and a capacitor with an anode composed of a sintered body made therefrom exhibits an enhanced withstand voltage. Preferably the average degree of roundness is at least 0.84.

By the term "degree of roundness" herein used, we mean a measure for expressing the rounded shape, and the degree of roundness is defined by the following equation.

$$\text{Degree of Roundness} = 4\pi \times S/L^2$$

wherein
S: projected area of a particle on a plane as observed when a projection of the particle is made perpendicularly to the plane, and
L: outer peripheral length of the above-mentioned projected area.

The projected area S and outer peripheral length L of a particle can be determined as an expediency by taking an SEM photograph of a particle, and measuring the area of a particle image and the outer peripheral length of the area assuming that the particle image area and the outer peripheral length thereof are S and L, respectively. The average degree of roundness is obtained by measuring the particle image area and the outer peripheral length thereof on a plurality of particle samples, for example, at least 100 particles, and preferably at least 1,000 particles. When the number of particle samples is larger, the more precise value is given for the determined average degree of roundness. Further, when an SEM photograph with a large magnification, for example, 2,000 magnifications, is taken to obtain a particle image having a large area, precise values for S and L can be obtained.

A niobium powder having a large average degree of roundness can be prepared, for example, by repeating a procedure of allowing a niobium powder, as obtained by pulverizing a niobium mass, to impinge on a flat plate, or a procedure of allowing particles of the as-obtained niobium powder to impinge upon another, whereby sharp edges of particles are removed.

The niobium sintered body for a capacitor of the present invention is made by sintering the above-described niobium powder containing at least one of niobium nitride, niobium carbide and niobium boride. For example, the above-mentioned niobium powder is press-molded into a compact with a desired shape, and then the compact is heated at a temperature of 500 to 2,000° C. under a pressure of 1 to $10^{-6}$ Torr for several minutes to several hours. It is to be noted that the procedure for making the niobium sintered body is by no means limited to this example.

For forming an electrolytic oxide film, the sintered body of a niobium powder is used as an anode in a protonic acid solution such as phosphoric acid, acetic acid, boric acid or sulfuric acid, a separately prepared anticorrosive metal sheet such as tantalum sheet or niobium sheet is used as a cathode, and a voltage is imposed between the anode and the cathode, thereby forming an electrolytic oxide film on the surface of the niobium sintered body. The voltage imposed is usually 3 to 4 times of an expected rated voltage of a capacitor with the sintered body of a niobium powder as an anode. In one preferable example for forming an electrolytic oxide film, a voltage is imposed between the niobium sintered body and a tantalum sheet in an aqueous phosphoric acid solution with a 0.1% by weight concentration while the aqueous solution was maintained at 80° C. The time for imposing the voltage may be sufficient for restoring to normal conditions defective parts occurring in the electrolytic oxide film, and a preferable time is, for example, approximately 200 minutes.

The LC value as used in the present invention is a current value as determined when the niobium sintered body having thereon an electrolytic oxide film is dipped in a 20% aqueous phosphoric acid solution and a voltage of 70% of the electrolysis voltage is applied for 3 minutes at room temperature.

The LC value is not larger than 300 $\mu A/g$, and is preferably, for example, 200 $\mu A/g$, and more preferably not larger than 200 $\mu A/g$. If the LC value exceeds 300 $\mu A/g$, the electric power consumed by the electric instrument increases due to the defective LC and reliability thereof is reduced.

The niobium sintered body for a capacitor preferably exhibits a product (C×V) [i.e., a product of capacity (C) with electrolysis voltage (V)] of at least 40,000 $\mu F \cdot V/g$ as measured after the electrolytic oxide film is formed thereon. When the product (C×V) is at least 40,000 $\mu F \cdot V/g$, the specific LC value can be desirably reduced to 5,000 [pA/($\mu F \times V$)] or smaller. The term "specific LC value" used herein is defined as follows. In the case where an dielectric layer is formed on a surface of the niobium sintered body by electrolytic oxidation, the leak current (LC) value, as measured when a voltage of 70% of the electrolysis voltage is applied for 3 minutes at room temperature to the niobium sintered body having a dielectric layer formed thereon, is divided by the product (C×V) to give a specific LC value. That is, the specific LC value is defined by the following equation:

$$\text{Specific } LC \text{ value} = LC/(C \times V)$$

wherein LC: leak current value, C: capacity and V: electrolysis voltage.

It is presumed that the niobium sintered body of the present invention has the following function. Niobium has a bonding force to oxygen, which is larger than that of tantalum, and therefore, there is a tendency of oxygen within the electrolytic oxide film readily dispersing toward niobium metal inside the sintered body. In contrast, in the niobium sintered body of the present invention, part of the niobium powder is bound to at least one element selected from nitrogen, carbon and boron, and therefore, oxygen within the electrolytic oxide film is difficult to bond to niobium metal and the dispersion of oxygen toward niobium metal inside the sintered body is suppressed. Nitrogen, carbon and boron strongly bind niobium, and thus, the bonding of oxygen to the niobium powder having an element selected from these elements, previously bound thereto, is suppressed.

Consequently, the stability of the electrolytic oxide film is kept and LC can be reduced.

A capacitor can be manufactured from an electrode composed of the above-mentioned niobium sintered body, a dielectric formed on a surface of the electrode, and a counter-electrode. The niobium sintered body is preferably used as an anode. The manufacture of the capacitor can be carried out by an ordinary procedure. When the niobium sintered body is used as an anode, a cathode comprising at least one material selected from electrolytes which are known in an aluminum electrolytic capacitor industry, organic semiconductors and inorganic semiconductors, is used as a cathode.

As specific examples of the organic semiconductors, there can be mentioned an organic semiconductor comprising benzopyroline tetramer with chloranil, an organic semiconductor predominantly comprising tetrathiotetracene, an organic semiconductor predominantly comprising tetracyano-quinodimethane, and organic semiconductors predominantly comprising electrically conductive polymers represent by the following formula (1) or (2), which are doped with a dopant.

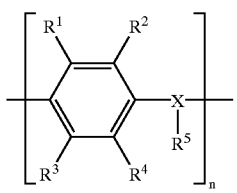
(1)

In formula (1), $R^1$, $R^2$, $R^3$ and $R^4$ represent hydrogen, an alkyl group or an alkoxy group, $R^1$ and $R^2$ may form together a ring, and $R^3$ and $R^4$ may form together a ring, X represents an oxygen, sulfur or nitrogen atom, and $R^5$ exists only when X is a nitrogen atom, and $R^5$ represents hydrogen or an alkyl group.

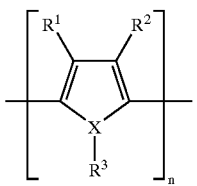
(2)

In formula (2), $R^1$ and $R^2$ represent hydrogen, an alkyl group or an alkoxy group, $R^1$ and $R^2$ may form together a ring, X represents an oxygen, sulfur or nitrogen atom, and $R^3$ exists only when X is a nitrogen atom, and $R^3$ represents hydrogen or an alkyl group.

As specific examples of the electrically conductive polymers of formula (1), there can be mentioned polyaniline, polyoxyphenylene and poly (phenylene sulfide); and, as specific examples of the electrically conductive polymers of formula (2), there can be mentioned polythiophene, polyfuran, polypyrrole and polymethylpyrrole.

As examples of the inorganic semiconductors, there can be mentioned inorganic semiconductors predominantly comprising lead dioxide or manganese dioxide, and inorganic semiconductors predominantly comprising triiron tetraoxide.

The invention will now be described specifically by the following working examples.

The characteristics of a niobium powder, a niobium sintered body and a capacitor were determined by the following methods.

(1) Average Particle Diameter ($\mu$m) of Powder

Average particle diameter of a niobium powder is expressed in terms of $D_{50}$ value, namely, a particle diameter ($\mu$m) when a cumulative weight in % reaches 50%, as measured by a particle size distribution measuring device "Microtrack".

(2) Bound Nitrogen Content, Bound Carbon Content and Bound Boron Content

The content of bound nitrogen in a niobium powder is measured by an oxygen-nitrogen measuring device made by LECO Co. wherein nitrogen content is determined from thermal conductivity. The content of bound boron in a niobium powder is measured by an ICP atomic emission spectrochemical analyzer made by Shimadzu Corporation. The content of bound carbon in a niobium powder is measured by a carbon content measuring device "EMIA110" made by Horiba Mfg. Co. The measured values of bound nitrogen content, bound boron content and bound carbon content are expressed as a ratio of each content to mass of the powder.

(3) Average Degree of Roundness of Powder

An SEM photograph (×2,000 magnifications) of a niobium powder is taken, the particle image is enlarged, and area (S) of the particle image and outer peripheral length (L) thereof are measured. The average degree of roundness is calculated from the following equation.

Degree of Roundness=$4\pi S/L^2$

The degree of roundness is determined on 1,000 sample particles and the average value is calculated.

(4) Porosity (%) of Sintered Body

Porosity in % of a niobium sintered body is determined by a mercury intrusion type pore distribution measuring device made by Shimadzu Corporation.

(5) Capacity ($\mu$F/g) of Sintered Body and Capacity ($\mu$F) of Capacitor

An niobium sintered body immersed in a 30% sulfuric acid and an electrode, made of tantalum, immersed in sulfuric acid are electrically connected to each other via an LCR measuring device, made by HP, intervening between the niobium sintered body and the tantalum electrode. The capacity ($\mu$F/g) of the niobium sintered body is measured at a frequency of 120 kHz.

Capacity ($\mu$F) of a capacitor is measured by directly connecting an electrode of the capacitor and a terminal of the LCR measuring device (Example 5).

(6) Leak Current (LC) Values ($\mu$A/g) of Sintered Body and LC Value ($\mu$A) of Capacitor A direct current is applied between a niobium sintered body immersed in a 20% aqueous phosphoric acid solution and an electrode immersed in an aqueous phosphoric acid by imposing a voltage of 14 V, which is 70% of the electrolysis voltage, for 3 minutes at room temperature. Then the current value ($\mu$A/g) is measured. The LC value of the niobium sintered body is expressed by the measured current value.

LC value ($\mu$A) of a capacitor is measured by directly connecting an electrode of the capacitor and a terminal of the LCR measuring device and imposing a voltage of 10 V (Example 5).

(7) Withstand Voltage (V) of Capacitor

A voltage stepwise increasing from 1 V at an interval of 1 V is imposed in order. The voltage-imposing time is one minute in each voltage-imposing step. The withstand voltage (V) is expressed in terms of a voltage imposed at a step immediately before a step at which the LC value exceeds 50 $\mu$A.

EXAMPLE 1
(Sintered Body of Partially Nitrided Niobium Powder)

A niobium powder having an average particle diameter of 3 μm was left standing at 400° C. for 3 hours in a nitrogen atmosphere to give a partially nitrided niobium powder having a bound nitrogen content of about 3,000 ppm by weight. Then, 0.1 g of the niobium powder obtained and a niobium lead wire were molded together to obtain a compact having a size of 3 mm ×3.5 mm×1.8 mm. Thereafter, the compact was sintered at 1,100° C. in vacuum (under a reduced pressure of 5×10$^{-5}$ Torr) to obtain a niobium sintered body. Thus, 20 niobium sintered bodies were prepared. Half of the sintered bodies were electrolytically oxidized at 20 V and the remaining were at 40 V, thereby forming an electrolytic oxide film on the surface of each sintered body. The electrolytic oxidation was carried out by using a tantalum plate as cathode and in an aqueous 0.1 weight % phosphoric acid solution at 80° C. for 200 minutes.

EXAMPLE 2
(Sintered Body of Partially Carbonized Niobium Powder)

The same niobium powder as used in Example 1 was placed in a carbon crucible, left standing at 1,500° C. for 30 minutes under a reduced pressure, taken up into room temperature and pulverized in a vortex mill to obtain a partially carbonized niobium powder having a bound carbon content of about 1,000 ppm by weight. Subsequently, in the same manner as in Example 1, niobium sintered bodies were obtained and an electrolytic oxide film was formed on each of the surface thereof.

EXAMPLE 3
(Sintered Body of Partially Carbonized and Partially Nitrided Niobium Powder)

After a partially carbonized niobium powder was obtained in the same manner as in Example 2, the partially carbonized niobium powder was nitrided in the same manner as in Example 1 to obtain a partially carbonized and partially nitrided niobium powder having a bound carbon content of about 1,000 ppm by weight and a bound nitrogen content of about 2,500 ppm by weight. Thereafter, in the same manner as in Example 1, niobium sintered bodies were prepared and an electrolytic oxide film was formed on each of the surface thereof.

EXMAPLE 4
(Sintered Body of Partially Boronized Niobium Powder)

Trifluoroboron was incorporated in the same niobium powder as used in Example 1, and the mixture was left standing at 300° C. for one hour under a reduced pressure to obtain a partially boronized niobium powder having a bound boron content of about 1,800 ppm by weight. Subsequently, in the same manner as in Example 1, niobium sintered bodies were obtained and an electrolytic oxide film was formed on each of the surface thereof.

Comparative Example 1
(Sintered Body of Untreated Niobium Powder)

Sintered niobium bodies were made and subjected to formation of an electrolytic oxide film on each of the surface thereof in the same manner as in Example 1 except that a niobium powder used was not nitrided.

Comparative Example 2
(Sintered Body of Tantalum Powder)

Compacts were prepared in the same manner as in Example 1 except that a tantalum powder having the same particle diameter was used in place of the niobium powder, nitriding of powder was not carried out, and a tantalum lead wire was used in place of the niobium lead wire. The resulting compacts were sintered at 1,700° C. in vacuum to obtain tantalum sintered bodies. Thereafter, an electrolytic oxide film was formed on each of the surface thereof in the same manner as in Example 1.

Evaluation of Sintered Body Having Electrolytic Oxide Film Formed Thereon

Average capacity per unit weight and average LC value of the sintered bodies having formed thereon an electrolytic oxide film were determined. The results are shown in Table 1. (C ×V) value was calculated from electrolysis voltage (V) and capacity (C), and specific LC value was calculated from LC and (C×V). The results are also shown in Table 1.

TABLE 1

|  | Electrolysis voltage (a) (V) | Capacity (b) (μF/g) | LC (μA/g) | CV (a × b) (μF · V/g) | Specific LC value [pA/(μF × V)] |
|---|---|---|---|---|---|
| Ex. 1 | 20 | 2,000 | 150 | 40,000 | 3,750 |
|  | 40 | 1,000 | 200 | 40,000 | 5,000 |
| Ex. 2 | 20 | 1,800 | 180 | 36,000 | 5,000 |
|  | 40 | 900 | 210 | 36,000 | 5,833 |
| Ex. 3 | 20 | 2,000 | 150 | 40,000 | 3,750 |
|  | 40 | 1,000 | 180 | 40,000 | 4,500 |
| Ex. 4 | 20 | 2,000 | 160 | 40,000 | 4,000 |
|  | 40 | 1,000 | 190 | 40,000 | 4,750 |
| Co.Ex.1 | 20 | 1,500 | 800 | 30,000 | 26,666 |
|  | 40 | 700 | 900 | 28,000 | 32,143 |
| Co.Ex.2 | 20 | 500 | 5 | 10,000 | 500 |
|  | 40 | 250 | 6 | 10,000 | 600 |

As seen from Table 1, when a niobium sintered body of the present invention, containing at least one of niobium nitride, nibioum carbide and niobium boride is electrolytically oxidized to form an electrolytic oxide film thereon, the resulting sintered body has an LC value not larger than 300 μA/g, more preferabaly not larger than 200 μA/g. When CV of the sintered body is enhanced to 40,000 μF·V/g or more, a capacitor having a specific value of not larger than 5,000 μpA/(μF×V) can be obtained.

EXAMPLE 5

In this example, effects of the degree of roundness of a nobium powder on the porosity and packed density of a niobium sintered body, and the withstand voltage and LC value of a capacitor were examined.

A commercially available niobium powder having an average degree of roundness of 0.72 and an average particle diameter of 40 μm round by a jet mill (specimen No. 1 to 8) or a vibrating mill (specimen No. 9 to 12) whereby finely divided niobium particles were impinged against each other to give a niobium powder having an average degree of roundness shown in Table 2. By varying the residence time in each mill, niobium powders having different average degrees of roundness were prepared. The niobium powders were classified into an average particle diameter in the range of 7 to 8 μm.

Each niobium powder was allowed to stand at 600° C. for 3 hours in a nitrogen atmosphere to prepare a partially nitrided niobium powder having a bound nitrogen content of approximately 3,000 ppm. When the nitriding was conducted, the degree of roundness of the niobium powder did not vary.

The partially nitrided niobium powder was press-formed into a compact having a diameter of 10 mm and a thickness of about 1 mm. The compact was sintered at 1,500° C. under a pressure of $10^{-5}$ Torr for 30 minutes to obtain a niobium sintered body having a weight of 0.30 g. By varying the pressure applied upon press-forming into the compact, various niobium sintered bodies having different porosities were prepared. Among these, sintered bodies having a porosity of 53% or 45% were fabricated into capacitors as follows.

Each niobium sintered body was electrolytically oxidized at 65 V in an aqueous phosphoric acid solution to form a niobium oxide dielectric film on the surface of the sintered body. The electrolytically oxidized sintered body was immersed in an aqueous manganese nitrate solution, and then, the sintered body was taken out from the solution and subjected to a decomposing treatment at 250° C. This procedure of immersing in an aqueous manganese nitrate solution and then decomposing at 250° C. was repeated to form a manganese dioxide dielectric semiconductor layer on the niobium oxide dielectric film. Further, a carbon paste and then a silver paste were coated in this order on the semiconductor layer, and finally the coated sintered body was encapsulated with an epoxy resin to obtain a capacitor.

The average degree of roundness of the niobium powder, the prosity and packed density of the sintered body, and the capacity, withstand voltage and LC value at 10 V were evaluated. The results are shown in Table 2.

TABLE 2

| Specimen No. | Nb powder Average degree of roundness | Sintered body Porosity (%) | Packed density (g/cm$^2$) | Capacitor Capacity ($\mu$F) | Withstand voltage (V) | LC value ($\mu$A) |
|---|---|---|---|---|---|---|
| 1 | 0.93 | 53 | 4.9 | 101 | 78 | 0.4 |
| 2 | 0.89 | 53 | 4.8 | 101 | 76 | 0.5 |
| 3 | 0.84 | 53 | 4.7 | 100 | 75 | 0.3 |
| 4 | 0.80 | 53 | 4.6 | 97 | 73 | 0.6 |
| 5 | 0.93 | 45 | 5.4 | 111 | 76 | 0.7 |
| 6 | 0.89 | 45 | 5.2 | 108 | 76 | 0.4 |
| 7 | 0.84 | 45 | 5.0 | 104 | 76 | 0.3 |
| 8 | 0.80 | 45 | 4.8 | 101 | 73 | 0.5 |
| 9 | 0.77 | 53 | 4.4 | 86 | 69 | 0.6 |
| 10 | 0.75 | 53 | 4.3 | 85 | 68 | 0.7 |
| 11 | 0.77 | 45 | 4.4 | 89 | 69 | 0.7 |
| 12 | 0.75 | 45 | 4.4 | 88 | 68 | 0.5 |

INDUSTRIAL APPLICABILITY

A capacitor manufactured from the niobium powder sintered of the present invention has a large capacity per unit weight, reduced leak current (LC) value as compared with a LC value he conventional capacitor. Thus, the capacitor made from sintered body of the present invention has a large capacity although its size is small.

Especially when the sintered body of the present invention is made of a niobium powder having a large average degree of roundness, it has a relatively large porosity and a good packed density, and a capacitor manufactured from this sintered body has a large capacity and good withstand voltage characteristics.

What is claimed is:

1. A niobium sintered body for a capacitor, which exhibits an LC value of not larger than 300 $\mu$A/g as measured after an electrolytic oxide film is formed thereon, and is made of a niobium powder having a degree of roundness of at least 0.8 as defined by the following equation:

$$\text{Degree of roundness} = 4\pi \times S/L^2$$

wherein
  S: projected area of a particle on a plane as observed when a projection of the particle is made perpendicularly to the plane, and
  L: outer peripheral length of the above-mentioned projected area.

2. A capacitor having an electrode comprising a niobium sintered body, a dielectric formed on a surface of the niobium sintered body, and a counter electrode; said niobium sintered body being made of a niobium powder and exhibiting an LC value of not larger than 300 $\mu$A/g as measured after the dielectric is formed on a surface of the niobium sintered body, wherein the niobium sintered body is made of a niobium powder having a degree of roundness of at least 0.8 as defined by the following equation:

$$\text{Degree of roundness} = 4\pi \times S/L^2$$

wherein
  S: projected area of a particle on a plane as observed when a projection of the particle is made perpendicularly to the plane, and
  L: outer peripheral length of the above-mentioned projected area.

3. A process for producing a niobium sintered body for a capacitor comprising the step of sintering a niobium powder containing at least one kind of niobium compound selected from the group consisting of niobium nitride, niobium carbide and niobium boride.

4. The process for producing a niobium sintered body for a capacitor according to claim 3, wherein the niobium sintered body contains bound nitrogen, bound carbon or bound boron in an amount in the range of 50 ppm by weight to 200,000 ppm by weight.

5. The process for producing a niobium sintered body for a capacitor according to claim 3, wherein the niobium powder has an average particle diameter of 3 $\mu$m to 30 $\mu$m.

6. The process for producing a niobium sintered body for a capacitor according to claim 3, wherein the niobium powder has a degree of roundness of at least 0.8 as defined by the following equation:

$$\text{Degree of roundness} = 4\pi \times S/L^2$$

wherein
  S: projected area of a particle on a plane as observed when a projection of the particle is made perpendicularly to the plane, and
  L: outer peripheral length of the above-mentioned projection area.

7. The process for producing a niobium sintered body for a capacitor according to claim 3, wherein the niobium sintered body produced exhibits an LC value of not larger than 300 $\mu$A/g as measured after an electrolytic oxide film is formed thereon.

8. The process for producing a niobium sintered body for a capacitor according to claim 3, wherein the niobium sintered body produced has a product (CV), which is a product of capacity (C) with electrolysis voltage (V), of at least 40,000 $\mu$F·V per g.

9. The niobium sintered body for a capacitor according to claim 1, which has a product (CV), which is a product of capacity (C) with electrolysis voltage, (V), of at least 40,000 $\mu$F·V per g.

10. The niobium sintered body for a capacitor according to claim 1, which is made of a niobium powder containing at least one compound selected from the group consisting of niobium nitride, niobium carbide and niobium boride.

11. The niobium sintered body for a capacitor according to claim 1, wherein the niobium sintered body contains bound nitrogen, bound carbon or bound boron in an amount in the range of 50 ppm by weight to 200,000 ppm by weight.

12. The niobium sintered body for a capacitor according to claim 1, wherein the niobium sintered body is made of a niobium powder having an average particle diameter of 3 μm to 30 μm.

13. The capacitor according to claim 2, wherein the dielectric formed on a surface of the niobium sintered body comprises niobium oxide formed by electrolytic oxidation.

14. The capacitor according to claim 2, which has a product (CV), which is a product of capacity (C) with electrolysis voltage (V), of at least 40,000 μF·V per g.

15. The capacitor according to claim 2, which is made of a niobium powder containing at least one compound selected from the group consisting of niobium nitride, niobium carbide and niobium boride.

16. The capacitor according to claim 2, wherein the niobium sintered body contains bound nitrogen, bound carbon or bound boron in an amount in the range of 50 ppm by weight to 200,000 ppm by weight.

17. The capacitor according to claim 2, wherein the niobium sintered body is made of a niobium powder having an average particle diameter of 3 μm to 30 μm.

\* \* \* \* \*

UNITED STATES PATENT AND TRADEMARK OFFICE
CERTIFICATE OF CORRECTION

PATENT NO.     : 6,521,013 B1
DATED          : February 18, 2003
INVENTOR(S)    : Kazumi Naito and Atsushi Shimojima It is certified that error appears in the above-identified patent and that said Letters Patent is hereby corrected as shown below:

<u>Title page,</u>
Item [54], Title, should read -- NIOBIUM SINTERED BODY FOR CAPACITOR AND PROCESS FOR PRODUCING SAME --

Signed and Sealed this

Second Day of December, 2003

JAMES E. ROGAN
*Director of the United States Patent and Trademark Office*